United States Patent [19]
Chesack et al.

[11] Patent Number: 5,822,965
[45] Date of Patent: Oct. 20, 1998

[54] APPARATUS AND METHOD FOR DEFLECTING GRASS CLIPPINGS

[75] Inventors: Gregory J. Chesack, Kenosha; Lynn G. Westbrook, Racine, both of Wis.

[73] Assignee: Textron Inc., Providence, R.I.

[21] Appl. No.: 818,434

[22] Filed: Mar. 17, 1997

[51] Int. Cl.⁶ .................................................. A01D 34/53
[52] U.S. Cl. .............................. 56/249; 56/320.1; 56/198
[58] Field of Search .................................. 56/249, 320.1, 56/12.4, DIG. 20, DIG. 24, 198, 199

[56] References Cited

U.S. PATENT DOCUMENTS

| | | |
|---|---|---|
| 383,632 | 5/1888 | Crosier . |
| 409,053 | 8/1889 | Miller . |
| 601,008 | 3/1898 | Trisler . |
| 621,445 | 3/1899 | Campbell .................................. 56/199 |
| 2,199,919 | 5/1940 | Limbach .................................. 56/253 |
| 2,517,184 | 8/1950 | Elliott ........................................ 56/249 |
| 2,715,810 | 8/1955 | Beneke ..................................... 56/249 |
| 2,718,742 | 9/1955 | Tangeman ................................ 56/17.4 |
| 4,191,007 | 3/1980 | Check ....................................... 56/199 |
| 4,777,786 | 10/1988 | Arnold ...................................... 56/199 |
| 4,970,852 | 11/1990 | Check et al. .............................. 56/199 |
| 4,999,984 | 3/1991 | Pelletier .................................... 56/249 |

Primary Examiner—Michael J. Carone
Assistant Examiner—Arpad Fabian Kovacs
Attorney, Agent, or Firm—Arthur J. Hansmann

[57] ABSTRACT

Apparatus and method for deflecting clippings from a reel-type lawn mower, and with the deflection being selective in either the forward direction or rearward direction relative to ground movement.

20 Claims, 4 Drawing Sheets

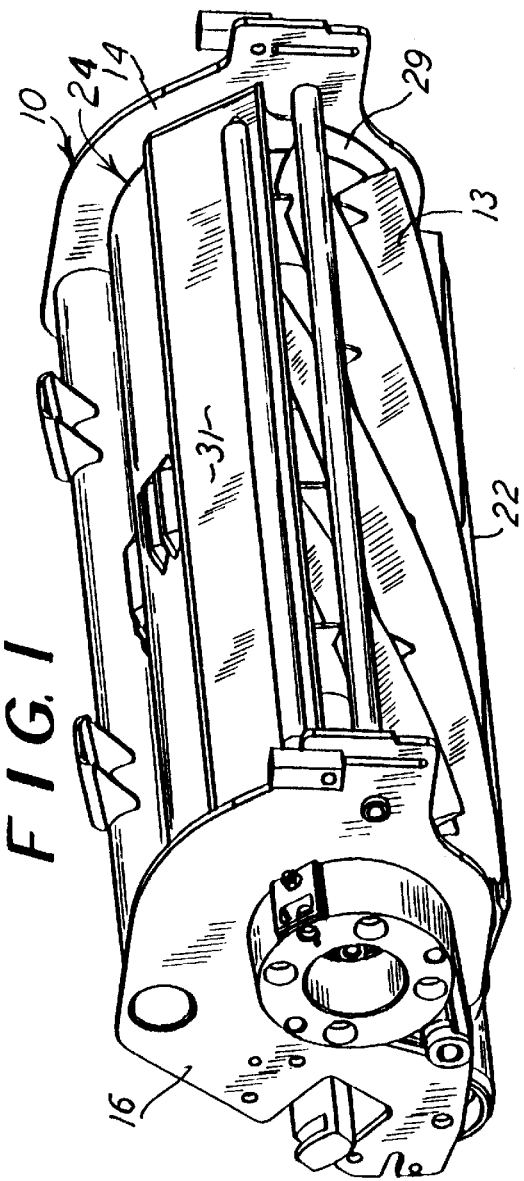
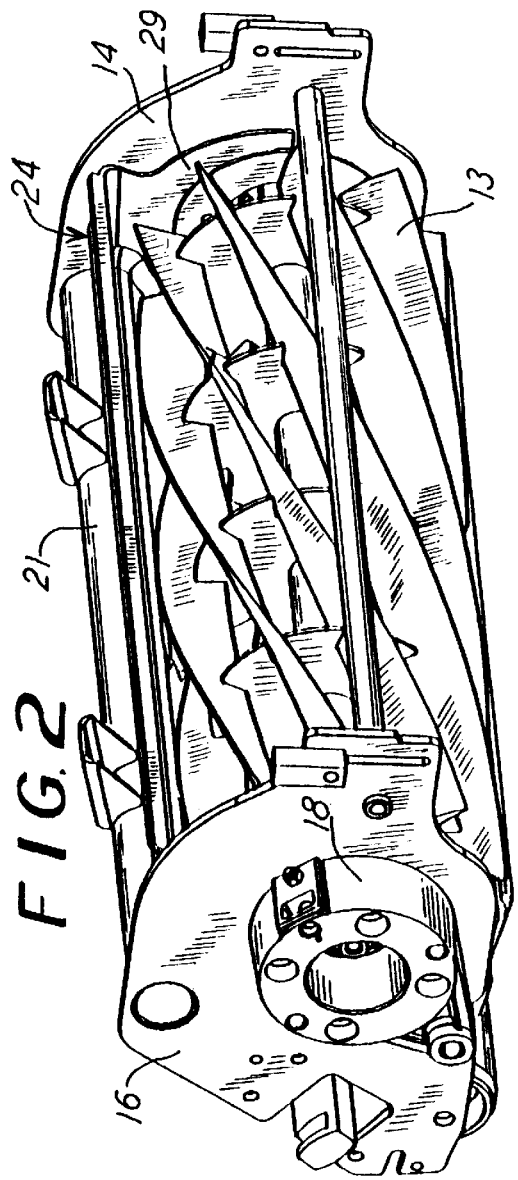

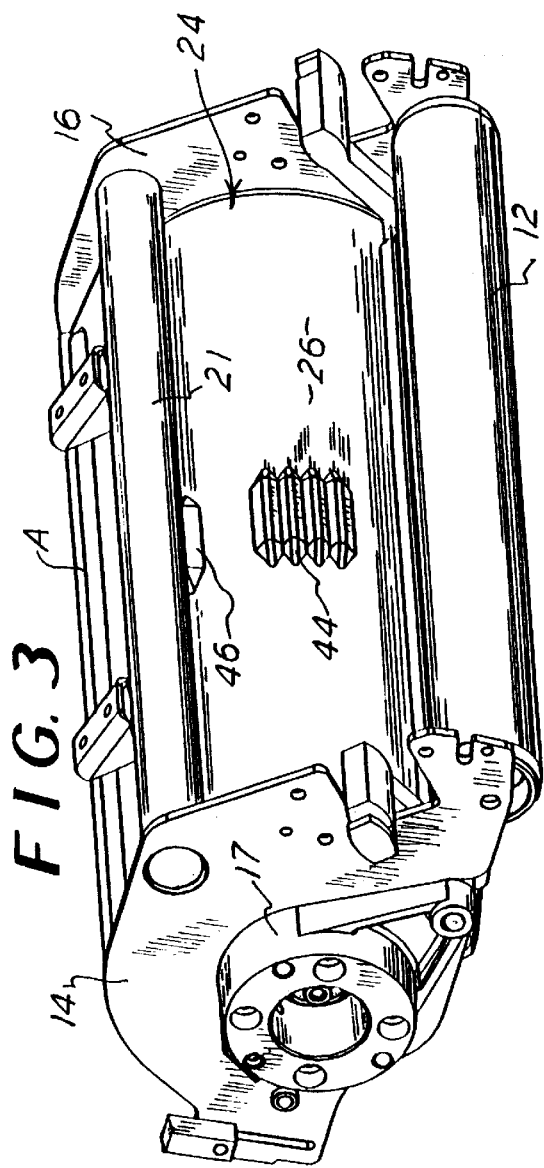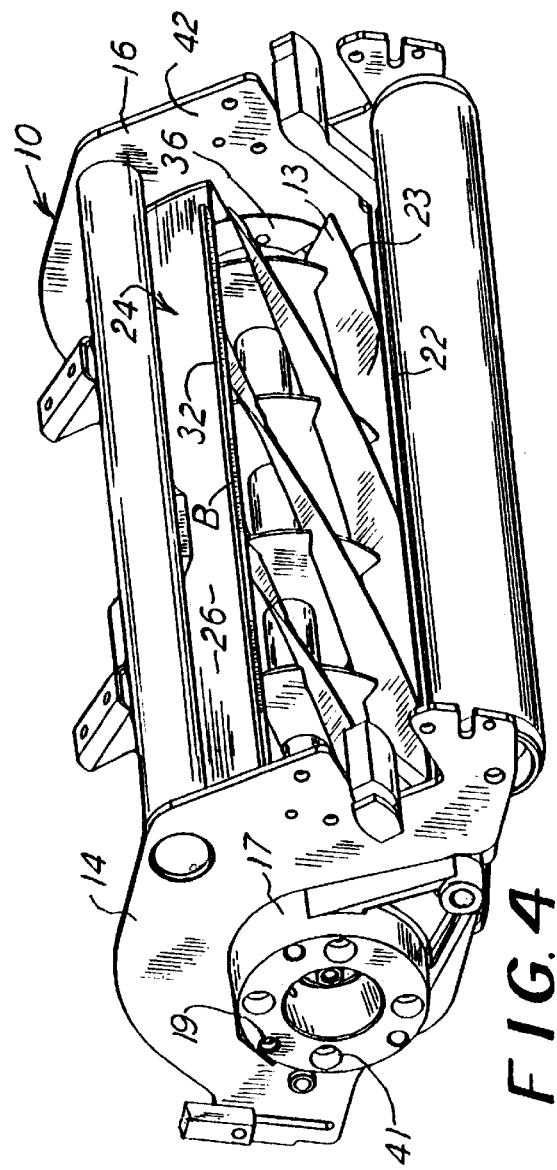

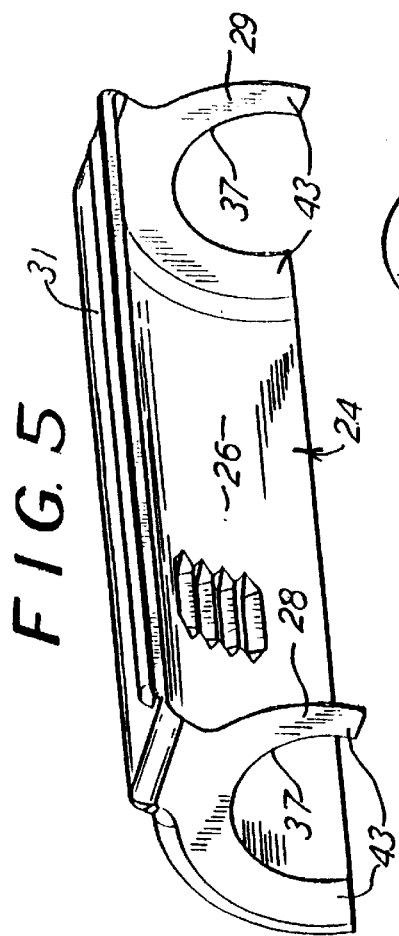
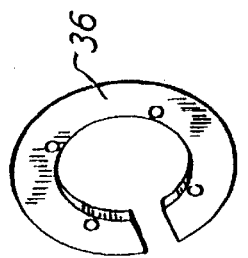
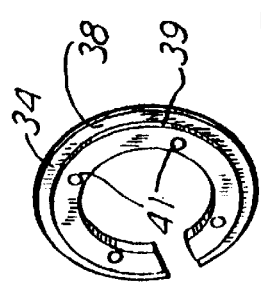
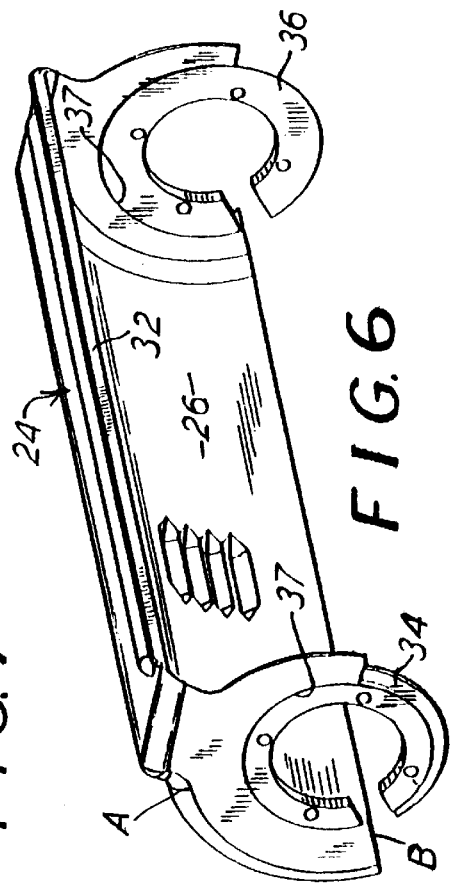
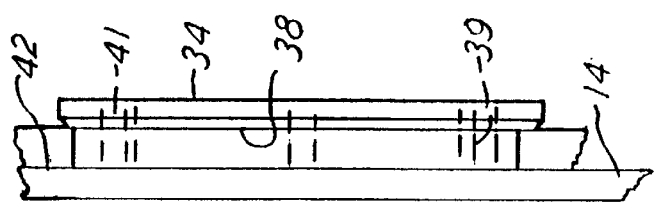

5,822,965

APPARATUS AND METHOD FOR DEFLECTING GRASS CLIPPINGS

This invention relates to apparatus and method for deflecting grass clippings which are normally produced by a reel-type lawn mower, particularly one which is utilized for ultimately accurate grass cutting.

BACKGROUND OF INVENTION

The prior art is already aware of reel-type lawn mowers which have a shield or deflector for directing the grass clippings either forwardly or rearwardly of the mower, that is, relative to the forward and rearward ground-direction of movement of the mower. These shields extend slightly spaced above the rotating reel, and they are effective for intercepting the grass clippings and directing them forwardly of the reel under the influence of the momentum of the cut clippings and also some flow of air created by the rotating reel acting somewhat as a fan moving air along the shield or deflector. These shields and deflectors can also be arcuate in shape to at least somewhat conform to the integral shape of the rotating reel itself.

The limitation of the prior art is that those shields or deflectors are arranged only to be physically attached to the mower, and they also are limited in that they have a fixed position relative to the mower, except for opening a portion or flap on the shield to permit the desired escape of the clippings from the confinement of the shield. Those arrangements are therefore restricted in their adaptation to the mower and also in the manners in which the shields are repositioned for the desired direction of movement of the grass clippings. In some instances, the prior art shields have hinged portions which become rusty and clogged with clippings, and thus the actuation of the hinge is sometimes impaired.

Still further, those prior art shields or deflectors which are physically attached to the mower must be again disassembled or detached in order to service the reel, such as cleaning and the like, and also in servicing or cleaning the shield itself because the cut clippings tend to cling to those parts of the mower.

Accordingly, in the present invention, the method and apparatus of this invention provides for the deflection of grass clippings by means of a shield which can be assembled with the basic mower without the requirement of fasteners or the like, and the shield can be readily and easily positioned between the positions for rearward or forward discharge of the clippings relative to the rotating reel.

Still further, the present invention provides the method and apparatus for deflecting relative to the mower wherein the deflector can be readily and easily assembled with the mower, such as by simply pressing it onto portions of the mower.

Also, the present invention provides for the method and apparatus of deflecting grass clippings in a manner where the deflector position can be set or adjusted with regard to deflecting in the forwardly directed position for ejection of the clippings, for instance. Still, while the deflector is readily and easily positioned between selected deflecting positions, including the extreme positions of forward and rearward clipping movement, the deflector is very readily positioned as desired and it is releasably secured in the selected position, including an adjusted position, without the need for any additional devices, such as fasteners or the like.

BRIEF DESCRIPTION OF THE DRAWINGS

FIG. 1 is a front perspective view of a portion of a mower with the deflector of this invention mounted thereon for rearward movement of the clippings.

FIG. 2 is a front perspective view of the mower and with the deflector mounted thereon for forward deflection of the clippings.

FIG. 3 is a rear perspective of the mower with the deflector mounted thereon for forward deflection of the clippings.

FIG. 4 is a rear perspective view of the mower with the deflector mounted thereon for rearward movement of the clippings.

FIG. 5 is a front perspective view of the deflector of this invention.

FIG. 6 is a front perspective view of the deflector with parts added thereto.

FIGS. 7 and 8 are perspective views of the aforesaid parts shown in FIG. 6.

FIG. 9 is an enlarged elevational view of the parts of FIGS. 7 and 8 and with the mower frame and the shield added thereto.

DETAILED DESCRIPTION OF THE METHOD AND APPARATUS

Description of the apparatus is given in accord with the various figures identified, and it will be seen and understood by anyone skilled in the art that the inventive method is also revealed in the description of the particular apparatus as presented herein.

Figure 10:
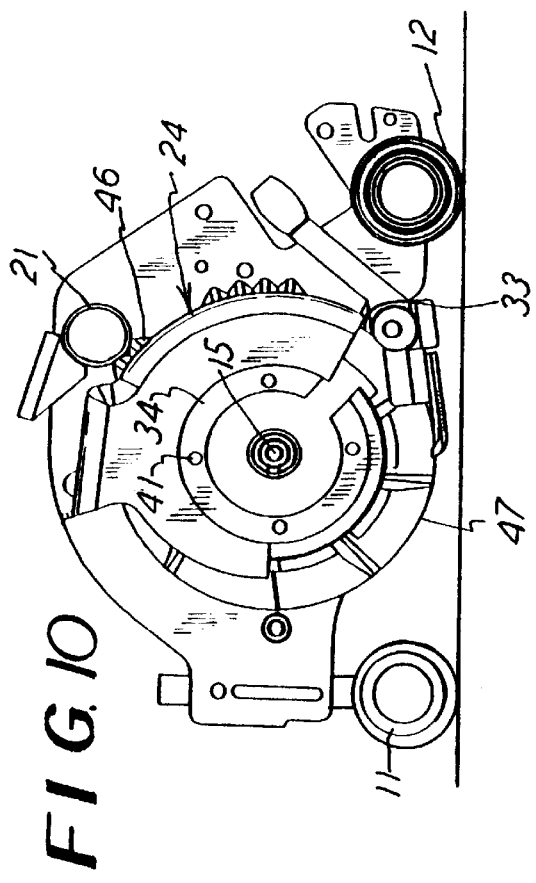
FIG. 10 is a left side elevational view of the mower with the shield mounted thereon for forward deflection of the clippings.

The drawings show a conventional reel-type lawn mower, generally designated 10, and supported on the ground by ground engagers, such as the forward and rearward rollers 11 and 12, as seen in FIG. 10. Thus, the mower 10 is supported for forward and rearward direction of movement over the ground, in the usual manner. The mower includes a rotatable reel 13 mounted on a longitudinal axis 15, again, as seen in FIG. 10. Left and right mower side plates 14 and 16 receive bearing supports 17 and 18 at each axial end of the reel 13, and the supports are secured to the side plates 14 and 16 by unshown screws which would be in the support holes 19. The supports 17 extend through a respective circular opening in the side plates 14 and 16, and of course the supports themselves are shown to be cylindrically shaped and thus have the curved arcuate outer surfaces. These supports are therefore affixed to the respective side plates 14 and 16 and they provide the rotational support for the reel 13 which rotates in the counter-clockwise direction, as viewed in FIGS. 10 and 11.

Figure 11:
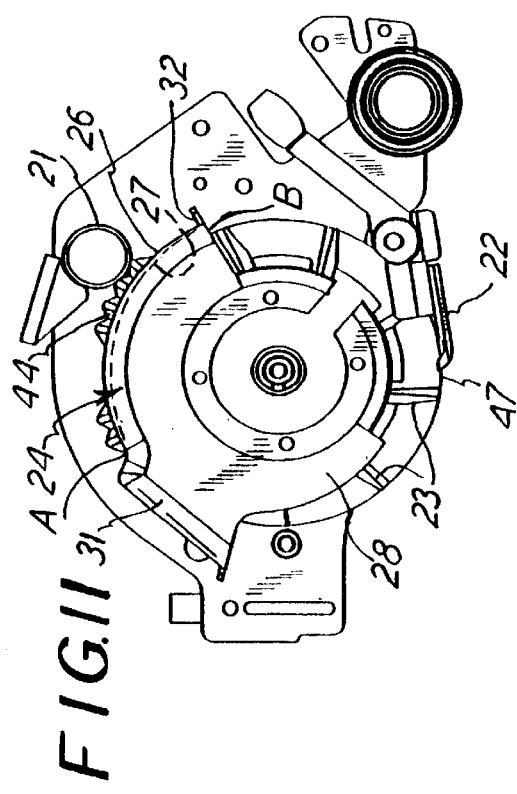
FIG. 11 is a left side elevational view of the mower with the shield mounted thereon in a position to permit the clippings to move rearwardly.

A cross tube 21 extends connected between the side plates 14 and 16 and serves as another portion of the mower frame, and the tube 21 is shown to be positioned at an elevation above that of the reel 13. A conventional bed-knife or cutter bar 22 is disposed below the reel 13 and extends for the length thereof. Therefore, upon rotation of the reel 13 in the counter-clockwise direction as viewed in FIGS. 10 and 11, the reel blades 23 ride over the cutter bar 22 and cut the grass to produce unshown grass clippings which are thus propelled rearwardly of the mower, with respect to the forward and rearward ground-direction of mower movement. That, of course, is conventional. As seen in FIGS. 1, 4, and 11, the cutting action mentioned will cause the grass clippings to be propelled and thrown rearwardly of the mower, and there may or may not be a grass catcher to receive those clippings.

FIGS. 1 through 4 show a grass clipping deflector or shield 24 which is movably mounted on the mower 10 to be positioned between the two positions shown among FIGS. 1 through 4. FIGS. 2 and 3 show the deflector 24 positioned rearwardly relative to the mower 10 and the deflector thus intercepts the rearwardly thrown grass clippings and directs those clippings forwardly of the mower 10, relative to the forward ground-direction mentioned. There could be a grass catcher (unshown) mounted on the front of the mower 10 to catch those clippings, if desired.

At this time it will already be seen and understood that the deflector 24 is readily movable between the two positions shown in FIGS. 1 through 4, to achieve either the forward or rearward discharge mentioned. It will also be seen that the deflector 24 is disposed within the side plates 14 and 16, and, in fact, is disposed within the projected area created by the edges or extremities of the side plates 14 and 16, and thus the deflector does not extend or project beyond the confines of the volume of the mower 10. FIGS. 3 and 4 show that the deflector 24 has an arcuate portion 26 which is centered on the axis 15 which is the longitudinal axis of the reel 13. Thus, the deflector 24 is coaxial with the reel 13 in the arcuate surface 26 of the deflector 24, and the undersurface, indicated at 27 in FIG. 11, of the deflector 24 is slightly spaced from the reel tips 23 but is parallel to the pass of movement of the tips 23.

FIGS. 5 through 9 show the deflector 24 separated from the mower 10, and it will here be seen that the deflector 24 includes the two end portions 28 and 29 which are perpendicular to the curved portion 26 and which extend in upright planes parallel to the fore and aft ground-direction movement mentioned. The entire deflector 24 is made of one piece of preferably plastic material which is resilient so that it can deflect and then regain its original position, for mounting onto the mower 10, in a manner hereinafter described, for instance. Also, the respective terminal ends A and B of the arcuate deflector portion 26 as seen in FIG. 11, for one place, are at the opposite ends along the path and extent of the arcuate curvature of portion 26, and the terminal ends have flat or planar portions 31 and 32 adjacent to the respective terminal ends which thereby disclose the terminal ends. Planar portions 31 and 32 extend the axial length of the deflector 24, and those portions are available for lending inherent strength to the deflector and to also serve deflection of the grass clippings which may impinge upon those two planar sections 31 and 32. In the forward deflection mode, as relative to FIGS. 2, 3, and 10, the deflector edge or planar portion 32 can rest on the bed-knife or cutter bar 22 at the location designated 33 in FIG. 10, for instance. That is, it will be understood that the cutter bar 22 extends rearwardly and upwardly to where it presents the disclosed rest at the location 33 for the entire length of the deflector 24.

FIGS. 6, 7, and 8, further show that there is a circularly shaped mounting piece 34 and 36 at each end of the deflector 24 to be nested in the circular openings 37 in the deflector portions 28 and 29, respectively. The pieces 34 and 36 present a circular wall 38, facing left and right, and also present a circular shoulder 39. These pieces 34 and 36 are attached to the respective mower side plates 14 and 16 by means of unshown screws which extend through screw holes 41 in the bearing supports 17 and 18, and the screws also extend through the shown screw holes in the pieces 34 and 36. Thus, the circular pieces 34 and 36 are secured to the inwardly facing walls or surfaces of the side plates 14 and 16, perhaps as best seen in FIG. 4. That is, the side plates 14 and 16 present inwardly facing surfaces 42, and the pieces 34 and 36 are attached to those supports 17 and 18 to present the surfaces 38 spaced from the surfaces 16 and thus provide a circular space for respective reception of the portions 28 and 29 at their circular openings 37, and as also shown in FIG. 9.

The deflector portions 28 and 29 thus have the circular openings 37 extending in slightly more than a 180 degree circular configuration, and therefore the ends or tips 43 of the portions 28 and 29 can flex when the deflector 24 is being pressed onto the pieces 34 and 36 to thus pivotally secure the deflector 24 on the pieces 34 and 36 which become part of the bearing supports 17 and 18 when screwed thereto, as described. Therefore, the curvature 37, being slightly more than a half circle of curvature, is coincidental in circular shape relative to the shoulder 39 on which it rests. Also, the edges of the portions 28 and 29 which are adjacent the circular openings 37 are confined between the bearing piece wall 38 and the side plate wall 42. In that arrangement, the deflector 24 remains clear of the radial and longitudinal ends of the reel 13, and the portions 28 and 29 lend rigidity to the otherwise slightly resilient deflector 24 which resilience is available for the press interference mounting mentioned on which is also available for releasably securing it relative to the cross tube 21, in a manner mentioned hereinafter.

It will now be understood, both from an apparatus and method standpoint, that the deflector 24 is mounted to be coaxial with the reel 13 and can be readily positioned for either forward or rearward discharge of the clippings. Also, to releasably secure the deflector 24 in either of the two positions, the deflector has a sequence of ridges 44 and ridges 46, and these two sequences are in a plurality of ribs or projections in each of the sets 44 and 46, as shown in FIGS. 1 and 3, for instance.

FIGS. 10 and 11 thus show the deflector 24 in the forward throw mode in FIG. 10 and the rearward throw mode in FIG. 11. In the rearward mode, the projections 44 are positioned and arranged in an interference or sliding contact with the mower frame or cross tube 21, and thus the deflector 24 is held in the position shown in FIG. 11. Also, it will be seen that if the deflector 24 were rotated slightly clockwise as viewed in FIG. 11, then two other ones of the four ribs or projections in the set 44 would engage the tube 21 to again hold the deflector 24 in that adjusted position though it would still be a rearward clipping discharge position.

FIG. 10 shows the deflector 24 in the forward discharge position, and here it will be seen that the ribs or projections 46 engage the cross tube 21 in that interference type fit, and that therefore holds the deflector 24 in the releasably secured position for forward clipping discharge. Also, the sliding or contact fit between the deflector 24 and the cross tube 21 assures that the deflector will remain in its operative downward position relative to the reel 13 and the clippings will not push the deflector 24 upwardly and out of the desired operative position.

The method is the pivotally mounting of the deflector 24 on the bearing supports 17 and 18 and coaxial therewith so that the curved deflector portion 26 is on the same circumferential location as that of the reel 13, and the operator can readily and easily maneuver the deflector 24 to either extreme position of forward or rearward throw and can also position the deflector 24 in an adjusted position relative to those throw directions, such as mentioned in connection with FIG. 11, for instance.

With the deflector being only snapped onto the mower, it can be readily removed for servicing the reel or the bed-knife and for servicing, replacing, or cleaning the deflector itself when it is removed. Also, the deflector arcuate portion 26 is concentric with the reel 13 and, with the reel cutting edges 23, it defines a fragment of a cylindrical space therebetween.

To mount and to remove the deflector, it is positioned to be beyond the cross tube 21 and then can be moved relative to the mower, at least after the front roller bracket is removed, if that is even necessary to do. FIGS. 10 and 11, in the shown circle 47, show the circumferential path of the reel tips 23, and the diameter of the extent of the circle 47 is slightly spaced from the deflector portion under surface 27.

It is claimed:

1. In a lawn mower of the type having a rotatable reel mounted for rotation about a longitudinal axis on rotation supports located at both axial ends of said reel, a ground support supporting said reel for moving said reel over the ground in both a forward mowing direction and a rearward direction, and a bed-knife mounted adjacent said reel for cutting grass into clippings in cooperation with said reel, and with said bed-knife directing the grass clippings upwardly from said bed-knife upon rotation of said reel in one direction past said bed-knife, the improvement comprising:

a grass clippings deflector mounted on said rotation supports and including a panel disposed in the path of the upwardly moving cut grass clippings for deflecting the cut grass clippings into the circular path of rotation of said reel and into the ground-movement direction forwardly of said reel, and said deflector being mounted in a manner to be pivotal about said rotation supports and relative to said axis of said reel to a forward position relative to the ground-movement direction and thereby be free of deflecting said cut grass clippings, whereby said cut grass clippings are free to move past said deflector and rearwardly of said reel relative to the ground-movement direction.

2. In the reel-type lawn mower grass clipping deflector as claimed in claim 1, said deflector panel including a portion arcuate in configuration and about said longitudinal axis.

3. In the reel-type lawn mower grass clipping deflector as claimed in claim 2, said deflector panel including a planar extent adjacent to said arcuate portion for restricting the movement of said grass clippings in the direction radially outwardly relative to said longitudinal axis.

4. In a reel-type lawn mower grass clipping deflector as claimed in claim 3, there being one said planar extent adjacent to each terminal end in the path of arcuate curvative of said arcuate portion.

5. In a reel-type lawn mower grass clipping deflector as claimed in claim 1, said deflector including a side portion at each side of said panel at the locations respectively adjacent said rotation supports and extending in the plane of the ground-movement direction.

6. In a reel-type lawn mower grass clipping deflector as claimed in claim 5, said side portions having openings and being arranged to respectively slide over and partly surround said rotation supports and thereby releasably mount said deflector.

7. In a reel-type lawn mower of the type as claimed in claim 6, wherein:

said rotation supports are circular in cross-section and said circular cross-section being co-axial with said longitudinal axis, said openings of said side portions are circular and of the size of said circular cross-section to have said side portions in snug pivotal contact with said rotation supports, said side portions having extents defining said openings and extending therearound in more than 180° to be secure on said rotation supports, and said extents being resilient to expand and contract and thereby be slidable over said rotation supports in the mounting and dismounting of said deflector onto said rotation supports.

8. In the reel-type lawn mower as claimed in claim 7, the improvement including a set of two spaced-apart surfaces extending in upright planes and at each axial end of said reel, and said side portions being snugly pivotally disposed in the space between said spaced-apart surfaces of each said set.

9. The reel-type lawn mower as claimed in claim 1, wherein said mower includes a portion disposed in the pivotal path of said deflector for slidably engaging said deflector in the pivoted position of said deflector and thereby releasable secure said deflector in said pivotal position.

10. The reel-type lawn mower as claimed in claim 9 wherein said deflector is resilient and thereby slides past said mower portion and is positioned in interference fit with said mower portion in the pivoted positions of said deflector.

11. The reel-type lawn mower as claimed in claim 1, wherein said deflector is connected to said mower free of fasteners interconnected between said deflector and said mower.

12. A lawn mower for cutting and deflecting grass clippings, the improvement comprising a frame, rotation supports on said frame, a rotatable reel mounted for rotation about a longitudinal axis on said rotation supports which are located at both axial ends of said reel, a ground engager supporting said mower on the ground for moving said mower over the ground in both a forward mowing direction and a rearward direction, a bed-knife mounted adjacent said reel for cutting grass into clippings in cooperation with said reel and thereby direct the grass clippings upwardly from said bed-knife upon rotation of said reel in one direction past said bed-knife, a grass clippings deflector pivotally mounted on said supports and including a panel disposed in the path of the upwardly moving cut grass clippings for deflecting the cut grass clippings into the circular path of rotation of said reel and into the ground-movement direction forwardly of said reel, said deflector being mounted co-axial with respect to said reel and being pivotal to a forward position relative to the ground-movement direction and thereby be free of deflecting said cut grass clippings, whereby said cut grass clippings are free to move past said deflector and rearwardly of said reel relative to the ground-movement direction, said deflector being mounted on said supports free of any fasteners, and thereby be movable off said supports without the use of any tools, and said frame and said deflector having respective portions thereof located to be in sliding interference fit with each other upon pivoting said deflector, to thereby releasably secure said deflector in its selected pivoted position.

13. The reel-type lawn mower as claimed in claim 12 wherein said deflector is of a resilient material for the sliding interference fit with said frame, said frame including a cross bar extending above said deflector, and said deflector having a plurality of projections facing said cross bar and being spaced apart in the upright plane of the ground-movement direction for sliding fit with said cross bar in a manner to releasably secure said deflector in the pivoted position.

14. The reel-type lawn mower as claimed in claim 13 wherein said portion on said deflector is a sequence of protrusions positioned in the upright plane of the ground-movement direction for selective interference fit with said frame to achieve selective pivotal positioning of said deflector in its pivoted position.

15. The reel-type lawn mower as claimed in claim 12, wherein said deflector panel is in an arcuate configuration on a radius from said longitudinal axis.

16. The reel-type lawn mower as claimed in claim 12 wherein said deflector includes a side portion at each side of said panel at the locations respectively adjacent said supports and extending in the upright plane of the ground-movement direction.

17. The reel-type lawn mower as claimed in claim 12 wherein said side portions have openings and are arranged to respectively slide over and partly surround said supports and thereby releasably mount said deflector relative to said supports.

18. In a method of deflecting cut grass clippings from a reel type lawn mower which has a reel with a longitudinal axis and has a bed-knife and with the movement of said clippings being in either the direction of forward ground movement or rearward ground movement of the mower, the improvement comprising the steps of:

mounting a grass clipping deflector onto said mower to be movable in the upright plane of the forward and rearward ground movement of the mower in a location immediately above said reel, moving said deflector in said plane and either toward or away from said bed-knife to optionally position said deflector either adjacent said bed-knife, for forward deflection of said grass clippings, or spaced from said bed-knife, for rearward movement of said clippings, and moving said deflector into contact with said mower for releasably securing said deflector in either said position.

19. The method of deflecting grass clippings as claimed in claim 18, including the step of:

pivotally mounting said deflector onto said mower by press-fitting said deflector onto said mower through pressing said deflector downwardly onto said mower.

20. The method of deflecting grass clippings as claimed in claim 18, including the step of:

pivotally mounting, and then pivoting, said deflector about said longitudinal axis in achieving the deflection of said clippings.

* * * * *